United States Patent [19]
Clever et al.

[11] 3,865,331
[45] Feb. 11, 1975

[54] DRIVE INTERFACE SYSTEM

[75] Inventors: Raymond E. Clever, Chicago; Kenyon A. Hapke, Libertyville; Thomas R. Wells, Des Plaines, all of Ill.

[73] Assignee: Bell & Howell Company, Chicago, Ill.

[22] Filed: June 28, 1973

[21] Appl. No.: 374,283

[52] U.S. Cl. ................. 242/199, 242/67.4, 242/201
[51] Int. Cl. ... G03b 1/04, G11b 15/32, G11b 23/04
[58] Field of Search ........................... 242/197–205, 242/68.3, 67.4; 40/87, 88

[56] References Cited
UNITED STATES PATENTS

| | | | |
|---|---|---|---|
| 1,969,823 | 8/1934 | Smith | 242/205 X |
| 3,111,282 | 11/1963 | Proctor | 242/200 |
| 3,331,563 | 7/1967 | Roecks, Jr. et al. | 242/201 |

*Primary Examiner*—Leonard D. Christian

[57] ABSTRACT

A film driving system including a film cassette and an external film driving mechanism. The cassette includes drive interface means which positively engage with the external drive mechanism so that the film within the cassette can be transported between a pair of film reels provided in the cassette.

15 Claims, 5 Drawing Figures

PATENTED FEB 11 1975 3,865,331

DRIVE INTERFACE SYSTEM

BACKGROUND AND GENERAL DESCRIPTION

This invention relates generally to a film-handling cassette having an improved drive interface, and an external driving system which cooperates with the interface to transport the film within the cassette.

The film industry is constantly concerned with improvements in film handling and packaging techniques which minimize the time and expense in exposing, developing and projecting film. This concern has lead to the wide-spread use of film cartridges or cassettes which contain a supply of film, and which are adapted to be received within a camera so that the film will be exposed within the cassette. In fact, recent inventions have made it feasible to retain a supply of film within the same cassette during each of the exposure, development and projection modes of operation.

The increased use of film cartridges or cassettes, and the advent of a system which permits the film to be permanently retained in a cassette during several modes of operation, have increased the need for an improved drive interface on the cassette and an improved external driving system which cooperates with the drive interface to transport the film within the cassette. Since the cassettes are portable, and will be positioned in different equipment for different modes of operation (e.g., in a camera for film exposure and in a processor/viewer for development and projection), it is important to devise a system which assures positive engagement between the cassette drive interface and the external film driving system regardless of the random orientation of the cassette interface resulting from the previous use of the cassette in a different operating mode. The system also must assure positive non-slip driving of the film in the cassette.

The present invention provides an improved cassette drive interface and an improved external film driving system which accomplish the above objectives. Briefly described, the film cassette in accordance with the present invention includes a pair of rotatable film reels for storing and taking-up a supply of film. Drive interface means are provided on each reel in a position to be accessible from the exterior of the cassette. Each interface comprises an abutment means extending axially from the associated reel and defining a drive shoulder and a camming shoulder. The drive and camming shoulders are arranged to converge in a direction axial to the reel to thereby eliminate any surfaces which would interfere with the positive engagement of the drive interface with the external drive system.

The external driving system in accordance with this invention positively engages with the drive interface means provided on the cassette to selectively rotate the cassette reels and transport the film within the cassette. The driving system includes rotatable driving heads adapted to engage the driving shoulders on the cassette drive interface means to rotate the reels in a selected direction. Shifting means are also provided to shift the driving heads with respect to the cassette between a driving position in engagement with said driving shoulders and a disengaged position. The system further includes means for rotating each of said driving heads in a selected direction at a selected speed.

EXEMPLARY EMBODIMENT

Further objects and features of the present invention will be more apparent from the following description of an exemplary embodiment thereof, taken in conjunction with the following drawings, in which.

Figure 4:
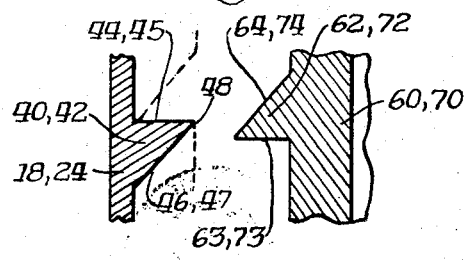
Figure 5:
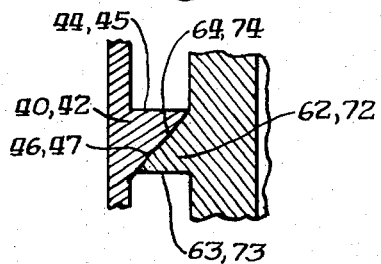

FIG. 4 is an enlarged and removed sectional view illustrating in solid lines the drive system disengaged from the cassette drive interface, and in phantom lines showing the driving system in driving engagement with the interface; and FIG. 5 is an enlarged and removed cross-sectional view illustrating the relationship between the cassette drive interface and the drive system in an intermediate stage of engagement.

Figure 3:
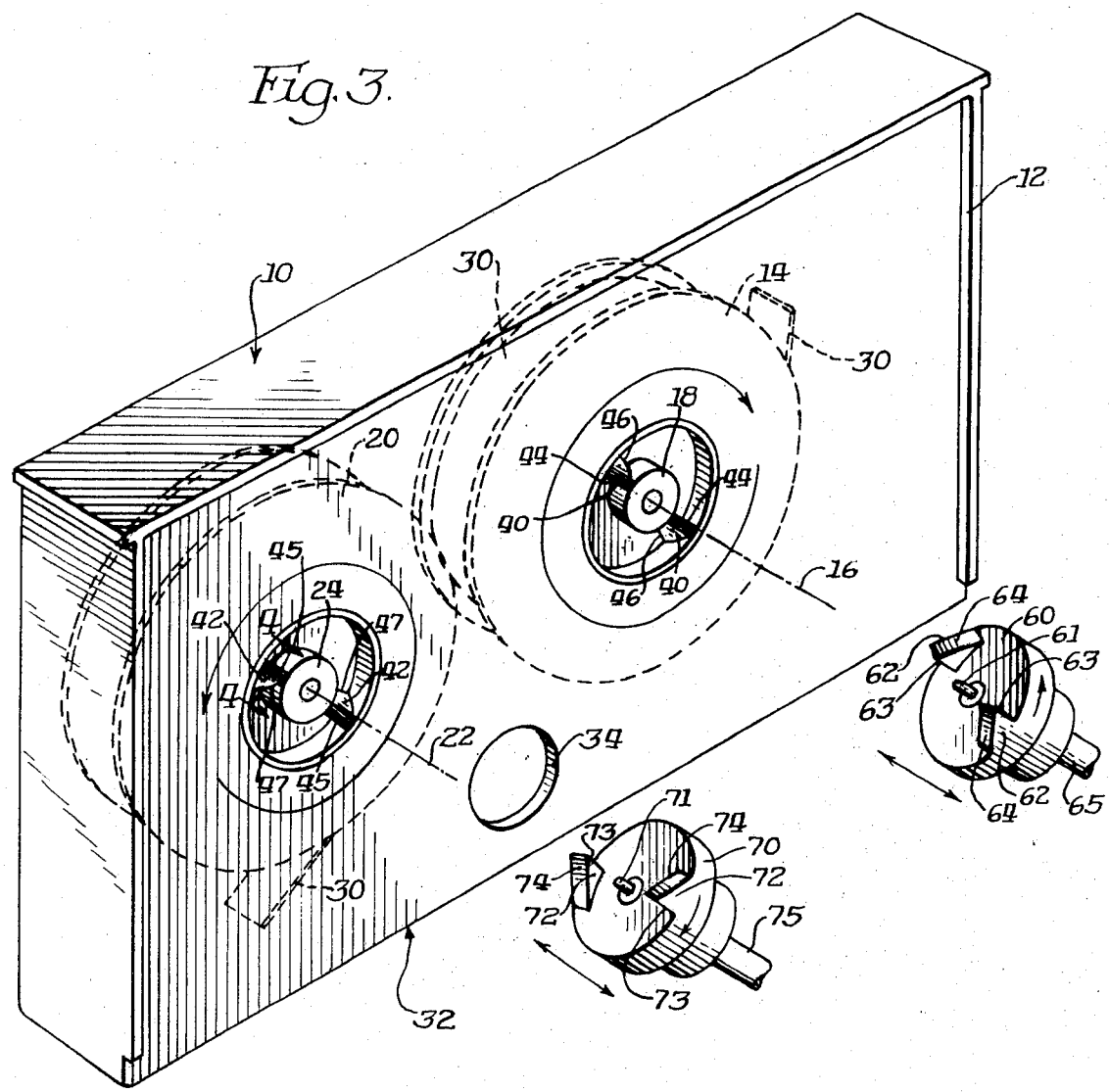
FIG. 3 is a perspective view illustrating the drive interfaces provided on the cassette and the relationship between the interfaces and the external drive system.

Referring generally to the drawings, a cassette embodying the reel drive interface in accordance with this invention is identified by the reference numeral 10, and the drive unit embodying the external driving system in accordance with this invention is identified by the reference numeral 50. As seen in FIG. 3, the cassette 10 includes a film housing 12 which is designed to house and protect a supply of film, such as motion picture film or the like. The housing 12 contains a film supply reel 14 which is mounted for rotation about the axis 16 of a recessed pivot point. A hub 18 is provided on the central portion of the supply reel 14 concentric with the pivot axis 16. The supply reel 14 will rotate freely about the axis 16 in unison with the hub 18. As indicated by the arrow in FIG. 3, the reel 14 and hub 18 in the illustrated embodiment are designed to be driven principally in a clockwise direction.

The housing 12 also contains a film take-up reel 20 which is likewise mounted for rotation about the axis 22 of a suitable recessed pivot point. A hub 24 is provided on the reel 20 concentric with the axis 22, so that the take-up reel 20 and hub 24 will rotate freely about the axis 22. In the illustrated embodiment, the take-up reel 20 and hub 24 are designed to be driven principally in a counter-clockwise direction, as indicated by the arrow in FIG. 3. Both reels 14 and 20 are adapted to receive a coil of film 30. The film 30 initially is coiled on the supply reel 14 and is transported between the supply reel 14 and the take-up reel 20, along a suitable path, by the rotation of the reels 14 and 20 by operation of the film drive system 50 in accordance with this invention.

The illustrated cassette 10 is adapted to house the film 30 continuously as the film is exposed, developed, and projected. Therefore, the cassette 10 includes a film gate area 32 along the transport path of the film 30 between the reels 14 and 20. The gate area 32 defines a suitable aperture through which the film 30 can be exposed and projected. A light port 34 is also provided for admitting a source of light during the projection mode of operation.

The cassette 10 in accordance with this invention includes a drive interface which permits the reels 14 and 20 to be positively engaged and driven in a selected direction by the driving system 50 which is external of the cassette. As seen in FIGS. 3–5, the drive interface comprises abutment members 40 and 42 positioned on the hubs 18 and 24 and the reels 14 and 20, respectively. In the illustrated embodiment each hub includes a pair of diametrically opposed abutment members 40 or 42 which extend generally radially from the associated hub 18 or 24. The abutment members 40 and 42 are designed to cooperate with the external drive system 50 which moves generally axially of the reels 14 and 20 into engagement with each of the abutment members.

In accordance with this invention, the abutment members 40 and 42 define driving shoulders 44 and 45, respectively, for engagement with the external driving system. As seen in FIGS. 4 and 5, the drive shoulders 44 and 45 are formed in a plane surface that extends in a generally axial direction with respect to the associated hub 18 and 24. The drive shoulders 44 and 45 can thereby be engaged by the external drive system 50 to transport the film 30 between the reels 14 and 20 by rotating the reel 14 in a clockwise direction and the reel 20 in a counterclockwise direction.

As seen clearly in FIGS. 4 and 5, the abutment members 40 and 42 further define inclined camming shoulders 46 and 47. The camming shoulders 46 and 47 are inclined at a selected angle with respect to the axis of the associated hubs 18 and 24 and with respect to the associated driving shoulders 44 and 45, respectively. The shoulders 46 and 47 in the illustrated embodiment are flat plane surfaces as seen in FIGS. 4 and 5. In other embodiments the shoulders 46 and 47 may have other configurations, such as concave or convex. In accordance with this invention, the shoulders 46 and 47 are arranged to converge with the associated driving shoulders 44 and 45 in a manner which eliminates any external retention surface on the abutment members 40 and 42, at the point of convergance of the associated shoulders, which would tend to restrain the drive system 50 from moving axially into positive driving engagement with the driving shoulders 44 and 45. As seen in FIGS. 4 and 5, in the illustrated embodiment, any such retention surfaces are eliminated by the convergance of the associated shoulders 44 and 46, and 45 an 47, along a line 48. Since the width of the line 48 is minimal, no retention surface is present which would interfere with the engagement of the drive shoulders 44 and 45 with the drive system 50.

The external driving system 50 is provided with a pair of driving heads 60 and 70 adapted for engagement with the driving shoulders 44 and 45 provided on the cassette 10. The heads 60 and 70 are arranged to be advanced axially with respect to the cassette hubs 18 and 24 into engagement with the driving shoulders 44 and 45. Likewise, the heads 60 and 70 can be selectively retracted in an axial direction to disengage the cassette from the external drive system 50.

As seen in FIG. 3, each head includes an axial pin 61 and 71, respectively, which engages in the recess defined in the aligned hubs 18 or 24 along the axes 16 and 22. The pins 61 an 71 are adapted to release a suitable brake (not shown) provided on the reels 14 and 20 which prevents the film 30 from unravelling or "clockspringing" from the reels. Each head 60 and 70 also includes projecting drive abutments 62 and 72 which are compatible with the abutments 40 and 42 provided on the associated hubs 18 and 24. More specifically, as shown in FIGS. 3–5, the abutments 62 and 72 include drive shoulders 63 and 73 which mate with the drive shoulders 44 and 45, respectively, on the hubs 18 and 24. The abutments 62 and 72 also define inclined camming shoulders 64 and 74 which are designed to engage with and slide along the camming shoulders 46 and 47 provided on the hubs 18 and 24.

In the illustrated embodiment, the head 60 is adapted to transmit a relatively high torque force to the supply reel 14. The head 60 includes a pair of diametrically opposed drive abutments 62 to assure positive coupling with the cassette interface and to further assure smooth transmission of the high torque force to the reel 14. The take-up reel 20 in the illustrated embodiment is adapted to be rotated through a slip clutch system with a low torque force. The associated driving head 70 is likewise provided with a pair of diametrically opposed drive abutments 72 which assure positive engagement between the head 70 and the drive interface provided on the hub 24.

Figure 1:
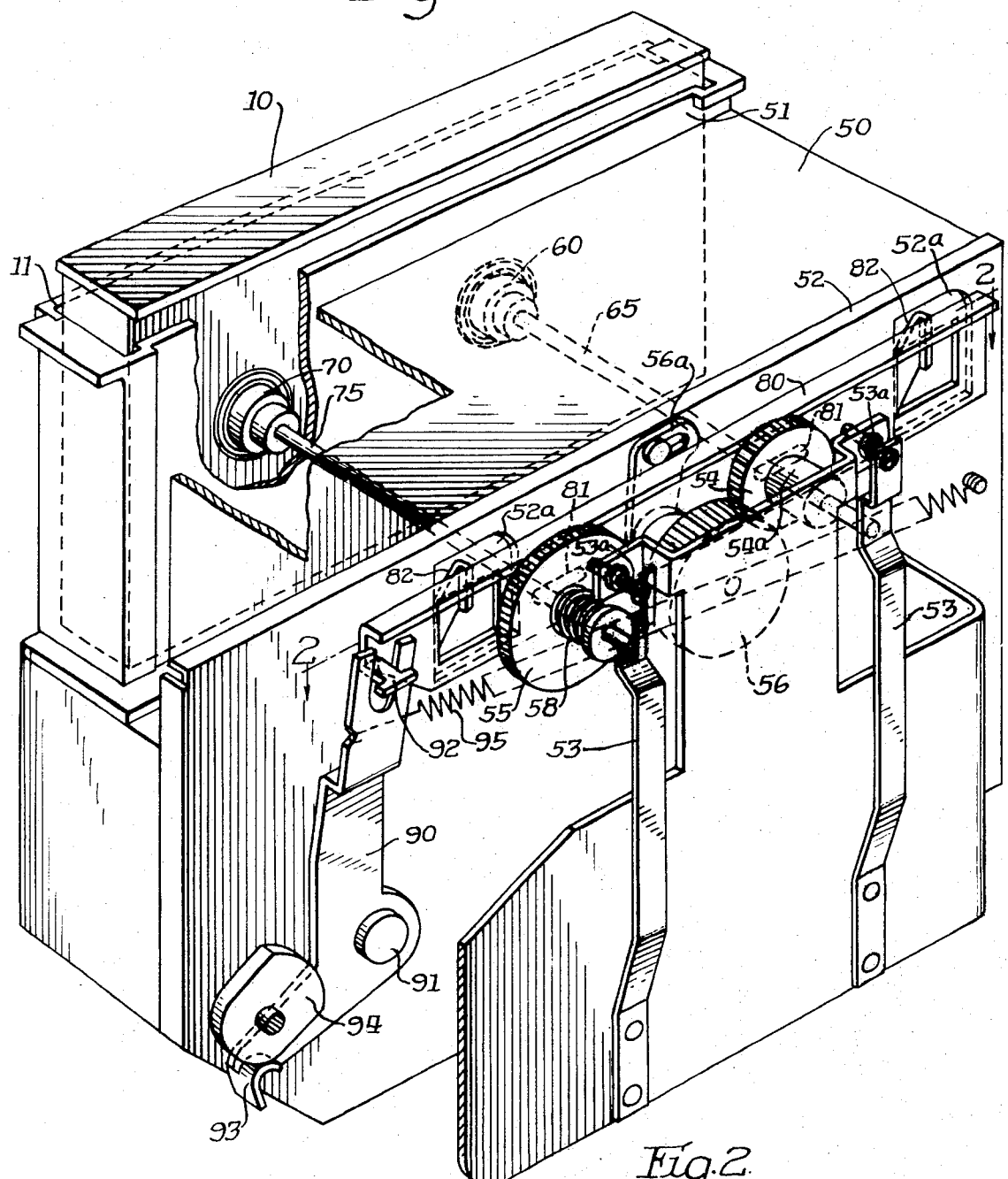
FIG. 1 is a perspective view showing the cassette drive interface engaged with the retractable external drive system in accordance with this invention.

The drive heads 60 and 70 are mounted on shafts 65 and 75. As seen in FIG. 1, the shafts 65 and 75 are slidably mounted in suitable bushings provided in the frame members 51 and 52 in a manner which permits the heads 60 and 70 to move axially. A pair of leaf springs 53 engage the outer ends of the shafts 65 and 75 and bias the shafts rearwardly toward the cassette 10.

Adjustable set screws 53a engage with the upper end of the springs 53 to limit the inward biasing force of the springs. The screws 53a are adjusted to establish the desired inward location for the heads 60 and 70 in the driving position with respect to the cassette 10. The screws 53a also prevent axial loading on the shafts 65 and 75 and the other components of the drive system 50 which would create friction drag in the drive system.

Figure 2:
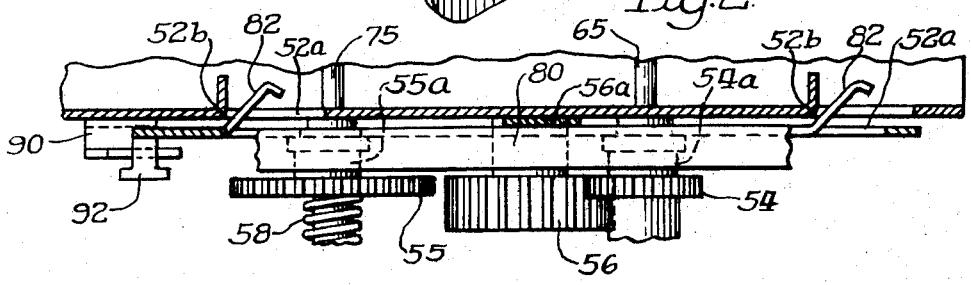
FIG. 2 is a cross-sectional view taken along the line 2—2 in FIG. 1 showing a portion of the mechanism for retracting the external drive system.

The external drive system 50 also includes a gear train adapted to rotate the shafts 65 and 75 in a selected direction and at a selected speed during the operation of the drive system. Pinion gears 54 and 55 are secured to the shafts 65 and 75, respectively, by means of gear hubs 54a and 55a, as seen in FIG. 2. A set screw (not shown) in the hub 54a joins the gear 54 directly to the high torque shaft 65. A spring-loaded slip clutch assembly 58 joins the gear 55 to the low torque shaft 75 in the illustrated embodiment. As seen in FIG. 2, the pinion gears 54 and 55 are joined to the shafts 65 and 75 in substantial alignment.

The gear train in the external drive system 50 also includes a main drive gear 56. The gear 56 is slidably mounted on a bracket 56a connected to the frame 52, and is positioned between the pinion gears 54 and 55. As seen in FIG. 2, the drive gear 56 can be shifted laterally by suitable drive control means (not shown) into engagement with the pinion 54 or 55 to control the rotation of the shafts 65 and 75 during different modes of operation of the drive system 50. For instance, the gear 56 wil be engaged with the pinion 55, and will drive the shaft 75 in a counter-clockwise direction, to advance the film from the supply reel 14 to the take-up reel 20 during a projection mode of operation. Likewise, the gear 56 will be shifted into engagment with the pinion 54, and will drive the shaft 65 in a clockwise direction, to rewind the film 30 onto the supply reel 14.

The drive gear 56 in accordance with this invention is provided with a width which is selected to maintain the gear in meshing engagement with the pinion 54 or 55 throughout the operation of the external drive system 50. As seen in FIG. 2, the width of the gear 56 is substantially larger than the width of the pinions 54 and 55, so that the gear 56 remains engaged with the pinions as the drive heads 60 and 70 are shifted between the inward drive position and the outward disengaged position, as described above. To accomplish this arrangement, the width of the drive gear 56 exceeds the width of the pinions 54 and 55 by a dimension at least equal to the axial distance through which the heads 60, 70, shafts 65, 75, and pinions 54, 55 are shifted as the heads move between their driving and retracted or disengaged positions.

The drive system 50 also includes a cam bar 80 for selectively advancing and retracting the shafts 65 and 75 and the associated driving heads 60 and 70 in an axial direction. The cam bar 80 is positioned between the gears 54 and 55 and the frame member 52, and includes elongated slots 81 for receiving the shafts 65 and 75. As shown in FIGS. 1 and 2, each end of the cam bar 80 includes an axially projecting cam arm 82. The cam bar 80 abuts against the gear hubs 54a and 55a, and is arranged laterally so that the cam arms 82 project into recesses 52a provided in the frame member 52. Each recess 52a defines a cam edge 52b which will engage with the cam arms 82 as the bar 80 is shifted laterally with respect to the shafts 65 and 75.

The drive system 50 also includes a crank 90 pivotally mounted on a pin 91 to selectively shift the cam bar 80 laterally to advance or retract the drive heads 60 and 70. As seen in FIG. 1, the upper end of the crank 90 is bifurcated and engages with a T-shaped projection 92 on the cam bar 80. The lower end of the crank 90 defines a cam follower 93. A rotary cam 94, having a selected cam profile, is mounted adjacent the cam follower 93. In addition, a coil spring 95, or other suitable biasing means, is joined to the upper end of the crank 90 to bias the crank 90 and the cam bar 80 in a direction which urges the driving heads 60 and 70 toward their drive positions.

The operation of the cassette drive interface and the external drive system of the present invention is apparent from the above description of the illustrated embodiment. To begin the operation, the cam 94 is rotated by suitable means into a position which overcomes the biasing force of the spring 95 and depresses the cam follower 93. The cam 94 thereby causes the crank 90 to pivot about the pin 91 in a counterclockwise direction, as viewed in FIG. 1. The rotation of the crank 90 operates through the pin 92 to translate the cam bar 80 laterally a selected distance (to the left in FIG. 1). The cam arms 82 are thereby forced into engagement with the cam edges 52b on the frame member 52, and operate to move the cam bar axially outward (downward in FIG. 2). As the bar 80 moves outward the bar engages with the gear hubs 54a and 55a and likewise shifts the shafts 65 and 75 outwardly against the biasing force of the leaf springs 53. The movement of the shafts 65 and 75 thereby retracts the drive heads 60 and 70 a selected axial distance.

Once the driving heads 60 and 70 are retracted in the above-described manner, the drive system 50 is conditioned to receive the cassette 10 in a suitable slot 11. As described further in co-pending application by Kenyon A. Hapke, et al., entitled FILM CASSETTE SENSING AND RETAINING UNIT, filed June 28, 1973 under Ser. No. 374,282, the slot 11 includes suitable locating and positioning means to orient the cassette 10 with the film reel hubs 18 and 24 in axial alignment with the retracted driving heads 60 and 70. The spacial relationship between the cassette drive interface and the retracted driving heads 60 and 70 in this intermediate stage is shown in FIG. 4.

The driving system 50 can be shifted into a driving relationship with the cassette 10 after the cassette is positioned properly within the slot 11. To accomplish such shifting, the cam 94 is returned to the position illustrated in FIG. 1. The spring 95 will then rotate the crank 90 clockwise, and the crank will return the cam bar 80 to the normal position as shown in FIG. 2. The resulting translation of the bar 80 disengages the cam arms 82 from the edges 52b and returns the cam arms to the recesses 52. The biasing force of the leaf springs 53 will then advance the shafts 65 and 75 and the associated driving heads 60 and 70 inwardly toward the cassette 10.

The drive interface in accordance with this invention assures that the drive heads 60 and 70 positively engage with the driving shoulders 44, 45 provided on the cassette 10. As illustrated in FIGS. 3-5, the projecting abutments 62 and 72 on the drive heads 60 and 70 will be randomly spaced with respect to the cassette abutment members 40 and 42 as the drive system 50 moves the heads 60 and 70 axially toward the cassette. In one situation, the drive heads 60 and 70 could be oriented so that the drive shoulders 63, 73 mate immediately with the cassette drive shoulders 44 and 45. The heads 60 and 70 positively engage with the cassette drive interface in that situation.

Due to the random rotational orientation of the drive heads 60 and 70 a second situation could develop, where the abutments 62, 72 on the drive heads 60 and 70 are axially aligned with the cassette abutments 40, 42 as the heads move inwardly toward the cassette. This second situation, as illustrated in solid lines in FIG. 4, would create the maximum interference with the positive engagement between the drive heads 60 and 70 and the cassette drive interface. For instance, if the drive shoulders 44, 45 did not converge with the camming shoulders 46, 47, a detent surface would be created along the line 48 which would detain the axial movement of the heads 60 and 70. Hence, in this second situation, the drive heads 60 and 70 may be prevented from positively engaging with the cassette drive shoulders 44, 45.

The construction of the cassette drive interface in accordance with this invention precludes any substantial interference with the positive engagement of the drive heads 60 and 70 under the second situation described above. As seen in FIGS. 4 and 5, when the drive heads 60 and 70 approach the cassette 10 with the abutments 62, 72 axially aligned with the cassette abutments 40, 42, the inclined camming shoulders 64 and 74 on the drive heads engage with the camming shoulders 46, 47 on the cassette. Thus, further axial inward movement of the drive heads 60, 70 slide the heads along the mating camming surfaces 64, 74 and 46, 47 and rotate the casette and drive head abutments out of alignment. The drive heads 60, 70 are thereby moved from a disengaged position as shown in FIG. 4 into an engaged position as shown in FIG. 5. Continued rotation of the drive heads 60 and 70 will thereby positively engage the drive shoulders 63, 73 on the heads with the cassette drive shoulders 44, 45.

The third condition for engagement between the drive heads 60 and 70 with the cassette interface is where the abutments 62, 72 on the heads advance toward the cassette below the cassette abutment shoulders 40, 42 (as viewed in FIG. 5). In that situation, the abutments do not interfere with the engagement of the heads 60 and 70 with the cassette interface. The heads 60 and 70 will engage with the cassette in a manner illustrated in FIG. 5, so that continued rotation of the heads positively engages the drive shoulders 63, 73 with the cassette drive shoulders 44, 45.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A film driving system for selectively driving a supply of film between a pair of film reels comprising:
    a film cassette including a pair of film reels each mounted for rotation about an axis of a reel hub;
    drive interface means provided on each reel and accessible from the exterior of said cassette, said interface means comprising an abutment member extending axially from each hub and defining a drive shoulder and a camming shoulder extending in an axial external direction from the associated hub, with the drive shoulder and camming shoulder arranged to converge on each hub; and
    an external driving system for engaging said drive interface means to selectively rotate said reels and thereby transport film between said reels, said system including rotatable driving heads adapted to engage said drive shoulders on said interface means to rotate said reels in a selected direction, means to shift said driving heads with respect to said reel hubs between a driving position in engagement with said drive shoulders and a retracted position disengaged from said drive shoulders and driving means for rotating each of said driving heads in a selected direction at a selected speed, whereby said drive interface means assures positive engagement between said drive heads and drive shoulders when said heads are shifted toward said driving position.

2. A film driving system in accordance with claim 1 wherein said driving heads include axially projecting driving surface means engageable with the drive shoulders on the associated drive interface means to rotate said reels in response to the rotation of said heads, and further wherein said driving heads include cam surface means engageable with the camming shoulders on the associated drive interface means to cam said driving surface means toward the associated drive shoulders as said heads are shifted into said driving position.

3. A film driving system in accordance with claim 2 wherein said driving means drives one of said reels with a relatively low torque force and the other of said reels with a relatively high torque force, and further wherein said driving head associated with said high torque reel includes a plurality of axially projecting drive surfaces and camming surfaces for engagement with the associated drive interface means.

4. A film driving system in accordance with claim 1 wherein said means to shift said driving heads axially comprises movable cam means arranged to cam said heads through a selected distance between said driving and retracted positions.

5. A film driving system in accordance with claim 4 including biasing means urging said heads toward said driving position and wherein said cam means is arranged to overcome the force of said biasing means to shift said heads to said retracted position.

6. A film driving system in accordance with claim 5 including stop means engageable with said biasing means defining the limit of movement of said heads toward said driving position to thereby minimize the friction load in said external driving system.

7. A film driving system in accordance with claim 5 wherein said cam means comprises a cam bar laterally shiftable between a first position which permits said biasing means to move said heads to said driving position, and a second position which retains said heads in said retracted position.

8. A film driving system in accordance with claim 7 including crank means to selectively move said cam bar between said first and second positions.

9. A film driving system in accordance with claim 4 wherein said drive means for rotating each of said drive heads comprises a spur gear connected for rotation with each of said heads, with said spur gears located in substantial alignment, and a drive gear in meshing engagement with each of said spur gears, and further wherein the width of said drive gear exceeds the width of said spur gears by at least said selected axial distance through which said drive heads are shifted, so that the spur gears remain in full meshing engagement with said drive gear as said heads shift between said driving and retracted positions.

10. In a cassette for retaining a supply of film including a housing for protecting said film, a supply reel mounted for rotation about the axis of a supply hub within said housing and arranged to receive a coil of said film, and a take-up reel mounted for rotation about the axis of a take-up hub within said housing and arranged to receive said film from said supply reel, the improvement comprising:
    drive interface means provided on each of said reels and accessible from the exterior of said housing for releasable engagement with external drive means which rotate said reels and thereby transport said film between said reels, said drive interface means comprising an abutment member extending axially from each hub and defining a drive shoulder extending externally in an axial direction from the associated hub and engageable with the external drive means to rotate the associated hub and reel within said housing, the drive shoulder on one of said hubs being arranged to drive the associated reel in a clockwise direction and the drive shoulder on the other hub being arranged to drive the associated reel in a counter-clockwise direction, each abutment member further defining a second shoulder extending externally in an axial direction from the associated hub and converging with the associated drive shoulder, whereby said converging shoulders assure that the external drive means positively engages said drive shoulders to transport said film.

11. A film driving system in accordance with claim 2 wherein said drive shoulders on said interface means and said driving surface means on said driving heads are arranged to drive one of said reels in a clockwise direction and further arranged to drive the other of said reels in a counter-clockwise direction.

12. In a cassette for retaining a supply of film including a housing for protecting said film, a supply reel mounted for rotation about the axis of a supply hub means within said housing and arranged to receive a coil of said film, and a take-up reel mounted for rotation about the axis of a take-up hub means within said housing and arranged to receive said film from said supply reel, the improvement comprising:
    drive interface means provided on each of said reels and accessible from the exterior of said housing for releasable engagement with external drive means which rotate said reels and thereby transport said film beween said reels, said interface means comprising a hub wall on each of said hub means positioned transversely with respect to the associated hub axis, a central hub section projecting axially outwardly from each hub wall, abutment means projecting axially outwardly from each hub wall connected to the associated central hub and extending in a generally radial direction therefrom, each abutment means defining a drive shoulder extending outwardly from the associated hub wall in an axial plane and engageable with the external drive means to rotate the associated hub and reel within said housing, each abutment means further defining a cam shoulder extending outwardly from the associated hub wall in a plane inclined to said drive shoulder plane and converging outwardly with the associated drive shoulder, whereby said converging drive and cam shoulders provide each of said abutment means with a substantial base portion adjacent the hub wall to withstand a substantial driving torque from said external drive means and further provide said abutment means with an outward portion having a substantially reduced surface area which assures positive engagement between said external drive means and said drive shoulders.

13. The invention in accordance with claim 12 wherein said drive interface means on each of said reels includes a plurality of said abutment means diametrically opposed about the associated central hub.

14. The invention in accordance with claim 12 wherein said drive shoulder on one of said hub means is arranged to drive the associated reel in a clockwise direction and the drive shoulder on the other hub means is arranged to drive the associated reel in a counter-clockwise direction.

15. A film driving system for selectively driving a supply of film between a pair of film reels comprising:
    a film cassette including a pair of film reels each mounted for rotation about an axis of a reel hub means;
    drive interface means provided on each reel and accessible from the exterior of said cassette, said interface means comprising a hub wall on each of said hub means positioned transversely with respect to the associated hub axis, a central hub section projecting axially outwardly from each hub wall, abutment means projecting axially outwardly from each hub wall connected to the associated central hub and extending in a generally radial direction therefrom, each abutment means defining a drive shoulder extending outwardly from the associated hub wall in an axial plane and engageable with the external drive means to rotate the associated hub and reel within said housing, each abutment means further defining a cam shoulder extending outwardly from the associated hub wall in a plane inclined to said drive shoulder plane and converging outwardly with the associated drive shoulder; and
    an external driving system for engaging said drive interface means to selectively rotate said reels and thereby transport film between said reels, said system including rotateable driving heads adapted to engage said drive shoulders on said interface means to rotate said reels in a selected direction, means to shift said drive heads with respect to said reel hubs between a driving position in engagement with said drive shoulders and a retracted position disengaged from said drive shoulders, and driving means for rotating each of said driving heads in a selected direction at a selected speed;
    whereby said converging drive and cam shoulders provide each of said abutment means with a substantial base portion adjacent to the hub wall to withstand a substantial driving torque from said external drive heads and further provide said abutment means with an outward portion having a substantially reduced surface area which assures positive engagement between said external drive heads and said drive shoulders.

* * * * *

Disclaimer 3,865,331.—*Raymond E. Clever*, Chicago, *Kenyon A. Hapke*, Libertyville, and *Thomas R. Wells*, Des Plaines, Ill. DRIVE INTERFACE SYSTEM. Patent dated Feb. 11, 1975. Disclaimer filed Apr. 1, 1977, by the assignee, *Polaroid Corporation*.

Hereby enters this disclaimer to all claims of said patent.

[*Official Gazette May 24, 1977.*]